United States Patent
Ahrer

(10) Patent No.: US 12,269,222 B2
(45) Date of Patent: Apr. 8, 2025

(54) METHOD AND DEVICE FOR PRODUCING A REINFORCING PROFILE

(71) Applicant: GFM GmbH, Steyr (AT)

(72) Inventor: Rudolf Ahrer, Losenstein (AT)

(73) Assignee: GFM GmbH, Steyr (AT)

( * ) Notice: Subject to any disclaimer, the term of this patent is extended or adjusted under 35 U.S.C. 154(b) by 115 days.

(21) Appl. No.: 18/010,010

(22) PCT Filed: Aug. 11, 2021

(86) PCT No.: PCT/AT2021/060280
§ 371 (c)(1),
(2) Date: Dec. 13, 2022

(87) PCT Pub. No.: WO2022/040708
PCT Pub. Date: Mar. 3, 2022

(65) Prior Publication Data
US 2023/0249414 A1 Aug. 10, 2023

(30) Foreign Application Priority Data
Aug. 28, 2020 (AT) .............................. A 50728/2020

(51) Int. Cl.
*B29C 70/34* (2006.01)
*B29C 70/54* (2006.01)
(Continued)

(52) U.S. Cl.
CPC ............ *B29C 70/34* (2013.01); *B29C 70/545* (2013.01); *B29K 2105/0872* (2013.01); *B29L 2031/003* (2013.01)

(58) Field of Classification Search
CPC ........ B29B 11/16; B29C 43/361; B29C 70/34
See application file for complete search history.

(56) References Cited

U.S. PATENT DOCUMENTS

| 2015/0115506 A1* | 4/2015 | Jones .................... B29C 43/203 264/511 |
| 2015/0129111 A1 | 5/2015 | Bettina et al. |

(Continued)

FOREIGN PATENT DOCUMENTS

| DE | 10 2013 109 854 A1 | 3/2015 |
| EP | 1 481 790 A2 | 12/2004 |

(Continued)

*Primary Examiner* — Seyed Masoud Malekzadeh
*Assistant Examiner* — Debjani Roy
(74) *Attorney, Agent, or Firm* — Muirhead and Saturnelli, LLC

(57) ABSTRACT

Producing a reinforcing profile from at least one layer cut out of a preimpregnated fibrous web includes applying the at least one layer to a mould core that determines the profile shape, retaining the at least one layer on the mould core in an application region, and progressively pressing the at least one layer onto the mould core, starting from the application region, transversely to the profile longitudinal direction, as far as the profile longitudinal edges. In order to create advantageous production conditions, the layer may be pressed incrementally progressively so as to be shaped onto the mould core, in the longitudinal direction thereof, with the aid of moulding punches that are arranged offset with respect to one another both in the circumferential direction and in the longitudinal direction of the mould core and are able to be forced in the direction of the moulding faces of the mould core.

5 Claims, 3 Drawing Sheets

(51) Int. Cl.
     *B29K 105/08*     (2006.01)
     *B29L 31/00*      (2006.01)

(56) References Cited

U.S. PATENT DOCUMENTS

2016/0354982 A1\*  12/2016  Prause .................... B29C 70/34
2018/0162020 A1     6/2018  Cho
2019/0070772 A1     3/2019  Stone
2021/0379845 A1\*  12/2021  Abou-Assali Rodríguez ..............
                                                    B29C 70/38

FOREIGN PATENT DOCUMENTS

| | | |
|---|---|---|
| EP | 1 894 706 A1 | 3/2008 |
| EP | 2 006 074 A1 | 12/2008 |
| EP | 2 873 517 A1 | 5/2015 |
| EP | 3 115 185 A1 | 1/2017 |
| GB | 2567699 A | 4/2019 |
| JP | 51-20984 | 2/1976 |
| WO | WO 2010/100386 A2 | 9/2010 |

\* cited by examiner

METHOD AND DEVICE FOR PRODUCING A REINFORCING PROFILE

TECHNICAL FIELD

The system described herein relates to producing a reinforcing profile from at least one layer cut from a preimpregnated fibrous web.

BACKGROUND OF THE INVENTION

In the aircraft industry in particular, reinforcing profiles made of a fibre composite are used which run along a curved surface. This means that the layers required for the layer-by-layer construction of such a reinforcing profile, cut out of a preimpregnated fibrous web, must not only be shaped according to the profile cross-section transversely to the longitudinal direction of the profile, but also follow a spatial curve in the longitudinal direction of the profile. For this purpose, a mould core is used which determines the shape of the profile and follows the desired spatial curve in the longitudinal direction and against which the individual layers of the reinforcing profile to be produced are pressed in a shaping manner. In this process, the formation of folds and cavities that impair the mechanical properties of the reinforcing profile must be avoided, which often leads to a time-consuming manual laying of the individual layers while pressing them against the mould core.

For machine production of multi-layer reinforcing profiles made of a fibre composite, it has already been proposed (WO 2010/100386 A2) to press the individual fibrous webs, which are drawn from a supply spool and form the later layers, continuously onto a mould core, which is continuously conveyed with respect to the rollers, with the aid of rollers, where the individual fibrous webs are initially retained in an application region on the mould core by the rollers, which are offset relative to one another both in the longitudinal direction of the mould core and transversely thereto, and, starting from this application region, are progressively pressed against the mould core transversely to the longitudinal direction of the profile as far as the longitudinal edges of the profile, namely with the aid of the rollers which follow one another at a spacing in the direction of advance of the mould core and which are associated with the individual mould surfaces and the transitions between the mould surfaces. However, it is disadvantageous that the fibrous webs are accumulated in a wave-like manner in front of the rollers rolling under a contact pressure, which gives rise in particular to the formation of folds.

In order to avoid this disadvantage, it is known (US 2016/0354982 A1) to apply the individual layers cut out of a preimpregnated fibrous web one after the other onto the mould core or on the last layer applied to the mould core and to hold the layers in this position with respect to the mould core with the aid of holding-down devices, before the layers are pressed against the mould core in a shaping manner, starting from the held-down application region and proceeding transversely to the longitudinal direction of the profile as far as the longitudinal edges of the profile, using a shaping device, which, in the case of a usually largely symmetrical profile shape, has moulding tools acting on the individual layers on both sides of the central application region, which moulding tools, when acted upon, first press the layers against the mould core following the application region and then slide transversely to the longitudinal axis of the mould core under a corresponding application of pressure along the layers as far as longitudinal edges of the layers. The resulting stripping of the layers along the moulding surfaces of the mould core transversely to the longitudinal direction of the profile is intended to ensure wrinkle-free shaping of the individual layers, but this can only be achieved by applying additional negative pressure to the layers. Since the individual layers are pressed against the mould core over the entire length of the layers in one operation, the moulding tools extend over the entire length of the profile, where it must be taken into account that, due to a progression of the mould core along a spatial curve, the moulding tools follow the resulting progressions of the mould surfaces. In the case that the moulding tools have two elastically spreadable webs divided into mould fingers by edge slots, which act on the respective layer on both sides of the application region, this compensation is ensured by the fingers, which can each be deformed separately in a certain area, but with the disadvantage that no predetermined compression of the layers or of the reinforcing profile can be achieved via the fingers.

In order to at least partially cure reinforcing profiles made of preimpregnated fibrous webs lying in several layers on a mould core with the aid of ultrasound, it is also known (EP 2 873 517 A1) to press floatingly mounted sonotrodes in an overlapping circumferential distribution against the profile surfaces and to displace the mould core with the adjacent fibrous webs in relation to the sonotrodes in the longitudinal direction of the profile. By applying pressure to the sonotrodes, the fibrous webs lying on top of each other can also be compacted together. Apart from the fact that it is assumed that the fibrous webs are already wrinkle-free on the mould core, the relative movement between the sonotrodes and the fibrous webs in the longitudinal direction of the profile means that there is a risk that the fibrous webs will shift against each other and accumulate in front of the sonotrodes, in particular with increasing setting pressure of the sonotrodes. For this reason, a buffer foil between the sonotrodes and the reinforcing profile can only reduce this danger, but not eliminate it, as is also the case for sliding coatings on the sonotrodes.

SUMMARY OF THE INVENTION

The system described herein provides a method with the aid of which the fibrous web of at least one layer of the reinforcing profile to be formed can be pressed without folds against a mould core and compacted under a predetermined pressure application, namely progressively in the longitudinal direction of the profile.

Based on a method of the type described herein, the system described herein provides that the layer is pressed incrementally progressively so as to be shaped onto the mould core, in the longitudinal direction thereof, with the aid of moulding punches which are arranged offset from one another both in the circumferential direction and in the longitudinal direction of the mould core and are able to be forced in the direction of the moulding faces of the mould core.

Since, as a result of these measures, the moulding punches are lifted off the section of the layer shaped by the moulding punches and resting on the mould core between the shaping working strokes and are displaced by one conveying step in the longitudinal direction of the mould core relative to the layer resting on the mould core for a new forming step, the layer is pressed against the mould core step by step, avoiding a relative movement between the mould core and the moulding device which would cause wrinkling, so that the fibre layer is pressed against the mould core in a shaping manner, starting from a fixed application region transversely to a longitudinal direction of the profile and progressively as far as the longitudinal edges of the profile, namely progressively in the longitudinal direction of the profile due to mutual displacement of the moulding punches and the conveying steps. Since it is important to prevent a relative movement of the moulding punches with respect to the mould core in the longitudinal direction of the profile during the forming, the mould core can, for example, be stopped between the conveying steps. However, it is also possible to move the moulding device synchronously with the mould core during moulding punch application, which allows continuous conveying of the mould core. For continuous core conveying, it is also sufficient to provide the moulding punches with an elastically yielding support in the longitudinal direction of the profile, which compensates for the relative movement between the layer moved with the mould core and the moulding punches mounted in the stationary moulding device during the working strokes. The unavoidable shear loads on the fibrous web do not lead to any impermissible irregularities in the course of the layer, because any longitudinal distortions of the layer caused by shear loads are restored by the inherent elasticity of the fibrous web forming the layer due to the release of the layer between the working strokes. Due to the elimination of the relative movement between the mould core and the moulding punches in the longitudinal direction of the profile during the deformation of the fibrous web, the disadvantages associated with such a relative movement are avoided, which allows a progressive forming of the fibrous web layer along the mould core without the risk of wrinkling or distortion of the fibrous web even at higher contact pressures.

To produce a multi-layer reinforcing profile, with the exception of the first layer which is pressed directly against the mould core in a shaping manner, each further layer cut from a preimpregnated fibrous web is placed in an analogous manner on the previously moulded layer, retained in place in the application region and then progressively pressed against the previously moulded layer in a shaping manner from the application region to the longitudinal edge of the profile with the aid of the moulding punches arranged offset from one another both in the circumferential direction and in the longitudinal direction of the mould core. The individual layers can each be compacted separately during shaping. Uniform compaction over the length of the layers entails that the length of the conveying steps is adapted to the length of the moulding punches, so that after each conveying step the moulding punches deform the area of the layers immediately adjacent to the previously deformed longitudinal section or the deformation areas overlap.

For the production of a reinforcing profile from several layers cut from a preimpregnated fibrous web, a device having a mould core determining the shape of the profile, having holding-down devices retaining the layers on an application region of the mould core and having a moulding device for pressing the layers onto the mould surfaces of the mould core in a shaping manner can be the starting point. If the moulding device has moulding punches which can be acted upon in the direction of the moulding surfaces of the moulding core and are arranged offset from one another both in the longitudinal direction of the mould core and in the circumferential direction thereof, the structural prerequisites for the stepwise progressive pressing of the individual fibrous web layers against the moulding core or against the fibrous web layer applied last to the moulding core are given if the moulding device and the moulding core can be displaced stepwise relative to one another in the longitudinal direction of the moulding core.

If the step length of the mutual relative displacement of the moulding device and the mould core is selected to be equal to or smaller than the length of the moulding punches measured in the longitudinal direction of the mould core, the individual moulding punches are each used in a succession without spacing or in overlapping longitudinal sections of the fibrous web layer, so that after a number of conveying steps required for advancing the fibrous web layer in accordance with the length of the moulding device, the fibrous web is locally deformed to the profile shape determined by the mould core. With each further conveying step, the longitudinal section of the fibrous web layer that is completely pressed against the mould core or the fibrous web layer that was applied last and thus completely formed is extended.

In order to be able to easily change over the moulding device for different profile shapes, the moulding punches, which are optionally exchangeable, can each be mounted separately on a carriage that can be displaced transversely to the longitudinal direction of the mould core so that the moulding punches can be pivoted about an axis extending in the longitudinal direction of the mould core. This makes it possible to adjust the spacing and alignment of the moulding punches to the respective profile shape of the reinforcing profile to be produced. Particularly simple design conditions result in this context if the moulding punches with adjusting cylinders form a structural unit pivotably mounted on the carriages.

The holding-down devices are advantageously assigned to the moulding device, but this is not mandatory.

BRIEF DESCRIPTION OF THE DRAWINGS

The method according to the system described herein is explained in more detail on the basis of the drawings, wherein.

DETAINED DESCRIPTION OF VARIOUS EMBODIMENTS

Figure 1:
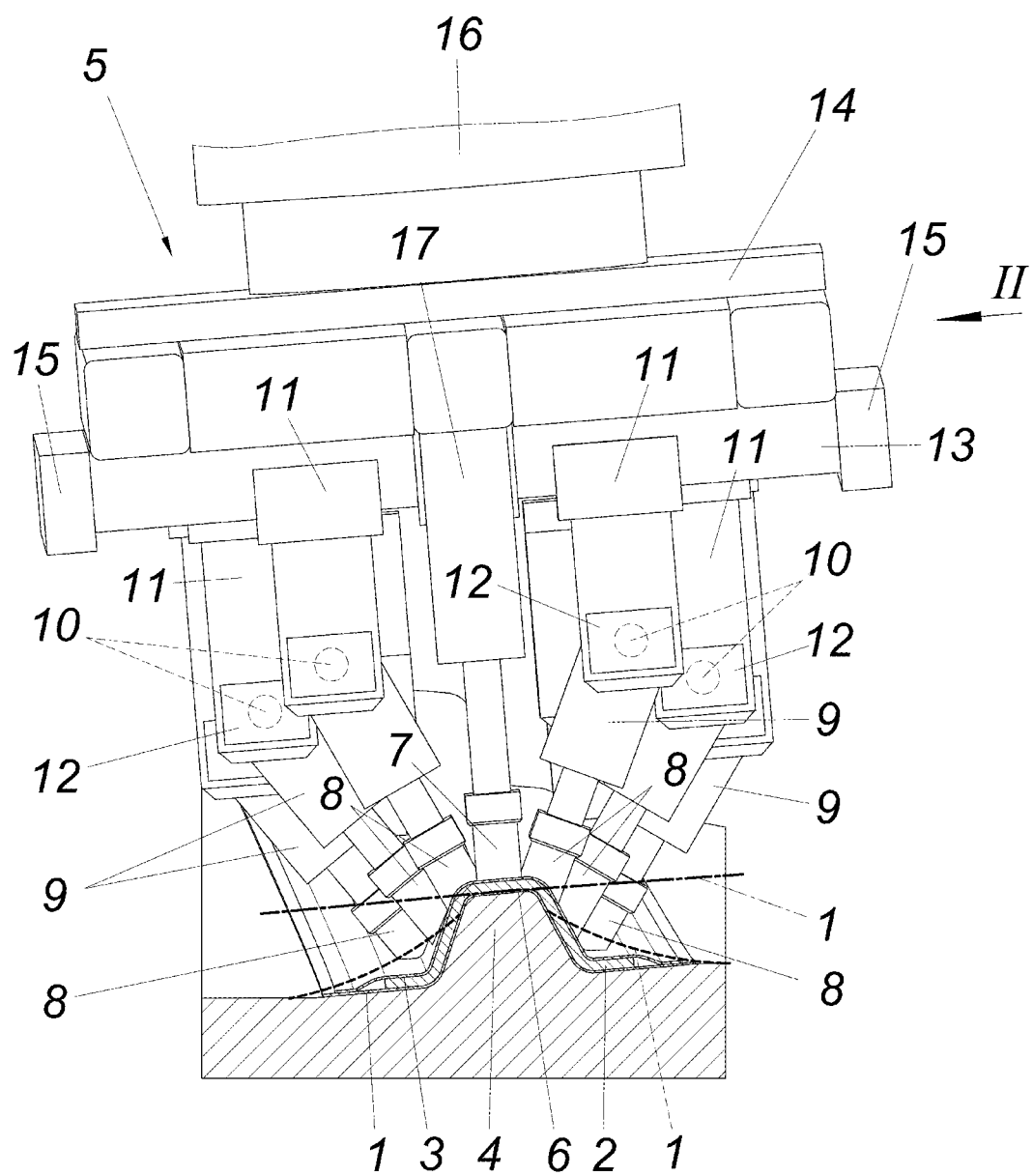
FIG. 1 shows a device according to the system described herein having a moulding device for producing a reinforcing profile in a section across the mould core.
Figure 2:
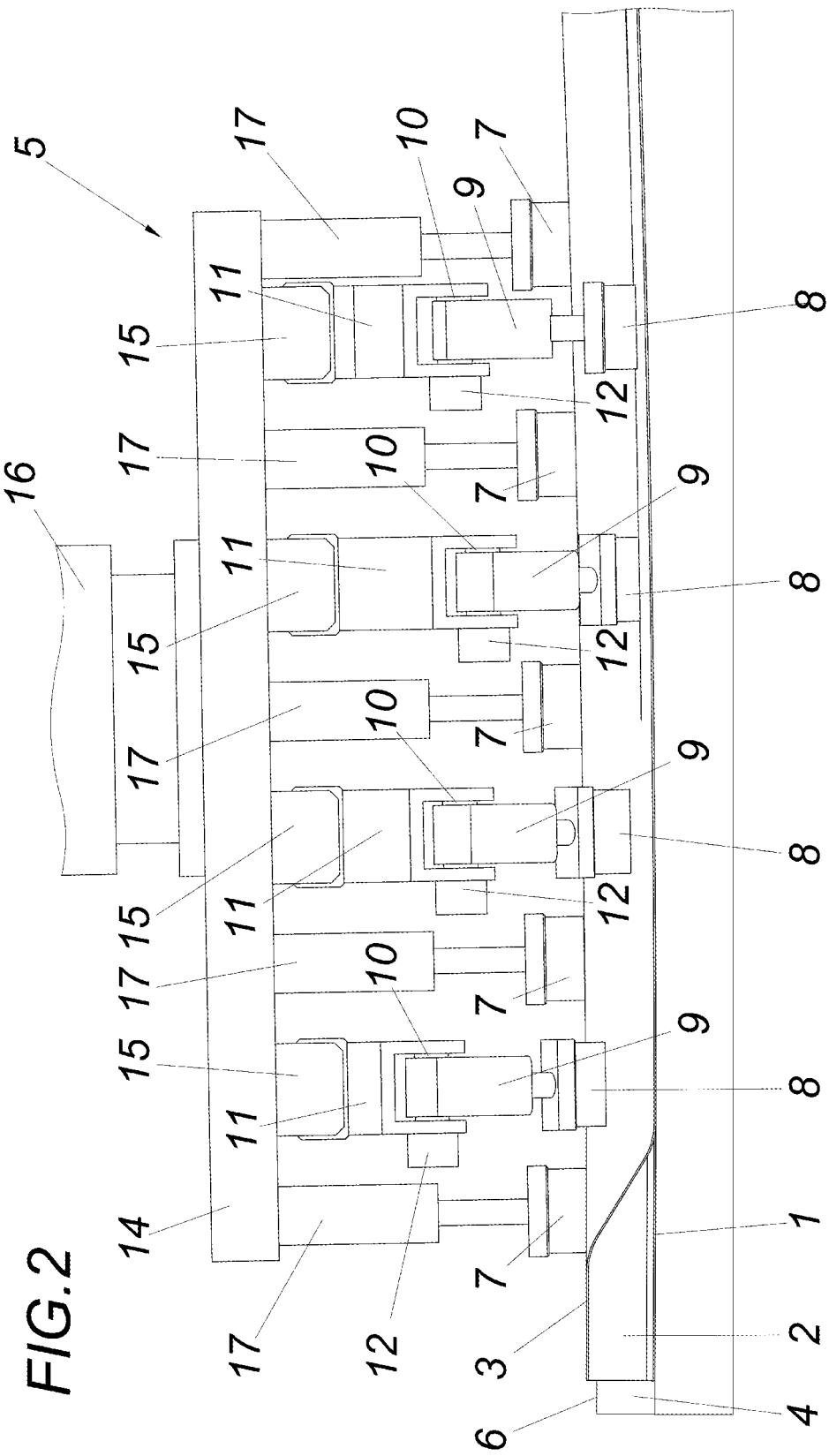
FIG. 2 shows this device in a side view in a direction of arrow II and FIG. 3 shows a top view of a mould core in a region of a moulding device, of which, however, only a distribution of loadable moulding punches is indicated.

The device shown for producing a reinforcing profile from usually several layers 1, 2, 3, in the exemplary embodiment a carrier layer 2 and two cover layers 1 and 3, has a mould core 4 which determines the profile shape, e.g. a hat profile, and the longitudinal course of the profile and against the moulding surfaces the layers 1, 2, 3 cut from preimpregnated fibrous webs are pressed one after the other in a shaping manner, namely with the aid of a moulding device 5. The moulding device 5 includes, on the one hand, holding-down devices 7 which hold the layers 1, 2, 3 in place on an application region 6 of the mould core 4 and, on the other hand, moulding punches 8 which are aligned with respect to the moulding surfaces of the mould core 4 and are acted upon by actuating drives 9. The moulding punches 8 are arranged offset from each other both in a longitudinal direction of the mould core 4 and in a circumferential direction of the mould core 4 in order to be able to press the layers 1, 2, 3 step by step one after the other onto the mould core 4 or onto a last applied one of the layers 1, 2. Due to the extensive profile symmetry, the moulding punches 8 are arranged in pairs on both sides of the application region 6. In order to achieve independent alignment of the moulding punches 8 with respect to forming surfaces of the mould core 4, the moulding punches 8 can be mounted so as to be freely pivotable to a limited extent or have an elastically flexible support.

The actuating drives 9 are preferably designed as actuating cylinders forming a structural unit with the moulding punches 8, which are mounted in a carriage 11 so as to be pivotable about an axis 10 formed in the longitudinal direction of the mould core 4 and are pivotably adjustable using a pivot drive 12. The carriages 11 are slidably guided in a frame 14 on guides 13 extending transversely to the longitudinal direction of the mould core 4 and can be adjusted along the guides 13 by drives 15. Via a joint head 16, for example of a manipulator, the moulding device 5 can be aligned with respect to the longitudinal course of the mould core 4, either to be displaced along the mould core 4 at rest or to be held at rest with respect to the mould core 4 displaceable in the longitudinal direction.

For the production of a reinforcing profile, after the alignment of the moulding device 5 with respect to the mould core 4 and an alignment of the moulding punches 8 with respect to the moulding surfaces of the mould core 4, the first layer 1 is placed in alignment on the application region 6 of the mould core 4 and held in place with respect to the mould core 4 using the holding-down devices 7, in that actuating drives 17 for the holding-down devices 7 are actuated accordingly. If, in an initial position, the pair of moulding punches 8 adjoining the application region 6 in the circumferential direction of the mould core 4 is actuated, the moulding punches 8 acted upon by the actuating drives 9 press the layer 1 against the mould core 4 in the transition area from the base to the side walls of the hat profile, where the layer 1 resulting from the initial position indicated by dot-dash lines in FIG. 1 is bent in a first deformation step into an intermediate position indicated by a dashed line around the longitudinal edge of the mould core 4 which determines the transition area.

Figure 3:
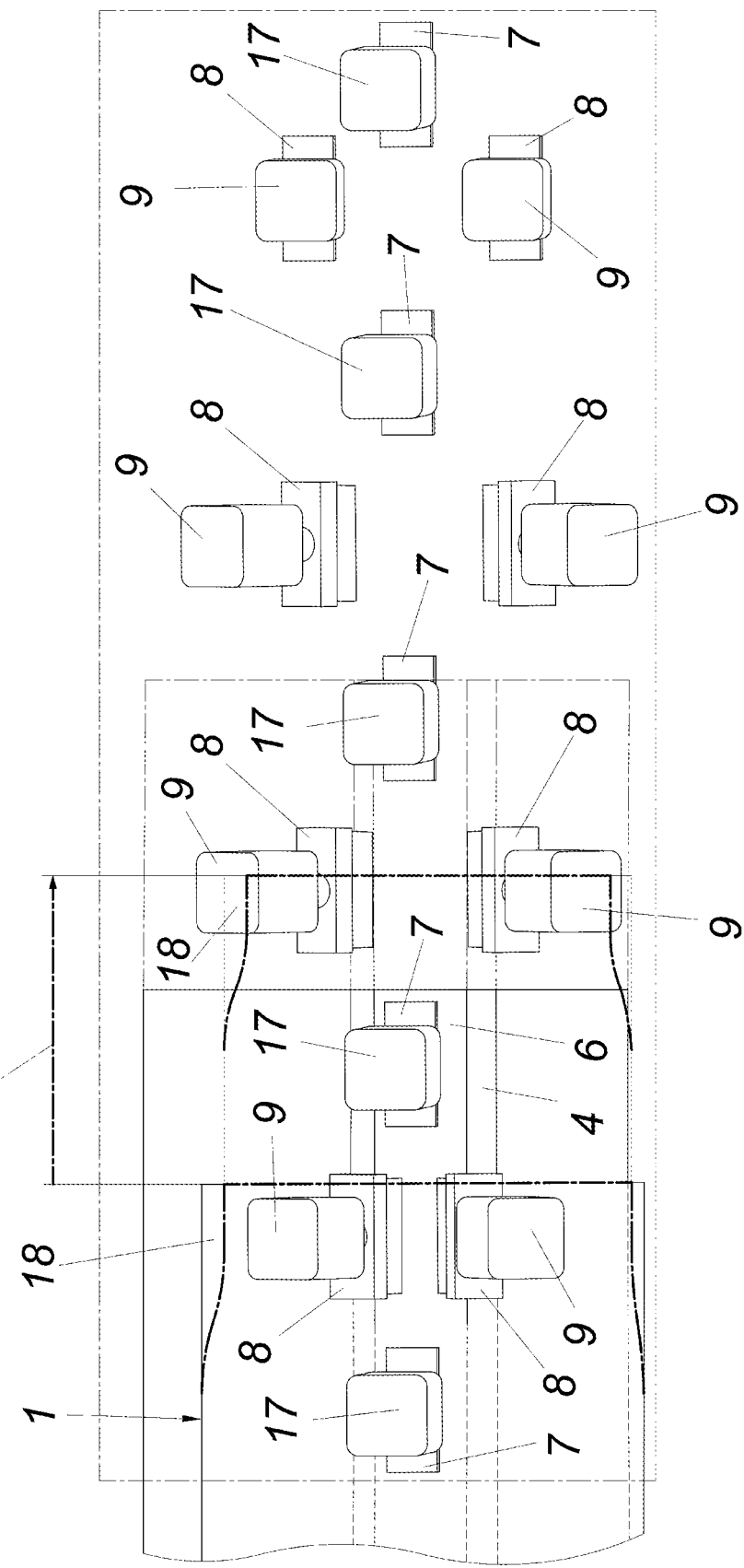

In FIG. 3, an inlet end 18 of the first layer 1, which has been inserted into the moulding device 5 and is located in the area of the first pair of the moulding punches 8 and has not yet been deformed, is shown in solid lines. The deformation of the inlet end 18, which is held on the application region 6 with the aid of the holding-down devices 7, by the first pair of moulding punches 8 is indicated by dot-dash lines. With each conveying step, the mould core 4 with the first layer 1 is displaced, with the holding-down devices 7 and moulding punches 8 lifted off, by a length which is selected to be smaller than the length of the moulding punches 8 measured in the longitudinal direction of the profile, in order to deform the layer 1 after each conveying step by the first pair of moulding punches, so that the layer 1 is continuously deformed over a length of the layer 1 in the region of the circumferential section defined by the first pair of moulding punches under a corresponding application of pressure in successive deformation steps.

According to the exemplary embodiment shown, the inlet end 18 bent by the first pair of moulding punches around the longitudinal edge of the mould core 4 between the base and the side walls of the hat profile reaches the region of the second pair of moulding punches 8 after three conveying steps corresponding to an arrow 19, as shown in thin dot-dash lines. In the inlet position, the inlet end 18 can be pressed against the side walls of the hat profile defined by the mould core 4 with the aid of the second pair of moulding punches in a second deformation step, as indicated by the thicker dash-dotted outline shape of the inlet end 18.

Due to the uniform spacing of the pairs of moulding punches from one another in the longitudinal direction of the profile, a further pair of moulding punches 8 of the pairs of moulding punches arranged offset over the circumference of the mould core 4 are used after every three further conveying steps until, with the last pair of moulding punches ending the shaping process, the first layer 1 at the exit of the moulding device 5 has the profile shape specified by the mould core 4.

With each further conveying step, the fully formed longitudinal section of the first layer 1 is extended until, after a complete pass, a second layer 2 can be applied in an analogous manner to the first layer 1 resting in a form-forming manner against the forming surfaces of the mould core 4. The layer application is repeated up to the last layer 3 before the shaped reinforcing profile can be removed from the mould core 4, optionally after at least partial curing of the preimpregnated fibrous webs.

Due to the pressure applied to the individual layers 1, 2, 3 by the holding-down devices 7 and the moulding punches 8 when the individual layers 1, 2, 3 are pressed against the mould core 4 or the last applied layer 1, 2, the individual layers 1, 2, 3 can be compacted according to the respective requirements, where the thickness of the respective layers can be detected by adjusting the actuating drives 9 or 17. In order to increase the compaction effect, the holding-down devices 7 and the moulding punches 8 can be acted upon by oscillating drives.

The invention claimed is:

1. A method for producing a reinforcing profile from at least one layer, comprising:
   cutting the at least one layer from a preimpregnated fibrous web;
   applying the at least one layer to a mould core to determine a shape of the reinforcing profile;
   retaining the at least one layer on the mould core in an application region; and
   starting from the application region, pressing the at least one layer against the mould core progressively transversely to a longitudinal direction of the reinforcing profile as far as longitudinal edges of the reinforcing profile, wherein the layer is pressed incrementally progressively so as to be shaped onto the mould core, in a longitudinal direction thereof, using moulding punches which are arranged offset from one another both in a circumferential direction and in the longitudinal direction of the mould core and are able to be forced in a direction of the moulding faces of the mould core.

2. The method according to claim 1, wherein, for production of a multi-layer reinforcing profile with subsequent layers in addition to a first one of the at least one layer, which is pressed directly against the mould core in a shaping manner, each of the subsequent layers is cut from a preimpregnated fibrous web and placed in an analogous manner on a previously shaped layer, retained in place in an application region and then progressively pressed against a previously moulded layer in a shaping manner from the application region to the longitudinal edge of the profile with the aid of the moulding punches arranged offset from one another both in the circumferential direction and in the longitudinal direction of the mould core.

3. The method according to claim 1, wherein a step length of a relative displacement of the mould core is less than or equal to a length of the moulding punches measured in the longitudinal direction of the mould core.

4. The method according to claim 3, wherein the moulding punches are exchangeable and are each mounted separately on a carriage that is displaceable transversely to the longitudinal direction of the mould core so as to be pivotable about an axis extending in the longitudinal direction of the mould core.

5. The method according to claim 3, wherein the moulding punches have adjusting cylinders that form a structural unit pivotably mounted on the carriage.

\* \* \* \* \*